United States Patent
Navarro et al.

(10) Patent No.: US 6,219,758 B1
(45) Date of Patent: *Apr. 17, 2001

(54) FALSE EXCEPTION FOR CANCELLED DELAYED REQUESTS

(75) Inventors: Jennifer Almoradie Navarro; Barry Watson Krumm; Chung-Lung Kevin Shum; Pak-kin Mak, all of Poughkeepsie; Michael Fee, Cold Spring, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/047,579

(22) Filed: Mar. 25, 1998

(51) Int. Cl.$^7$ .................................................. G06F 12/00
(52) U.S. Cl. ............................ 711/137; 711/169; 711/117; 711/204; 711/205; 711/207
(58) Field of Search .................................. 711/117, 127, 711/137, 207, 167, 169, 206

(56) References Cited

U.S. PATENT DOCUMENTS

| | | | |
|---|---|---|---|
| 4,985,825 | * 1/1991 | Webb, Jr. et al. | 711/169 |
| 5,423,014 | * 6/1995 | Hinton et al. | 711/3 |
| 5,539,895 | * 7/1996 | Bishop et al. | 711/138 |
| 5,699,553 | * 12/1997 | Iino et al. | 711/151 |
| 5,829,010 | * 10/1998 | Cherabuddi | 711/100 |

* cited by examiner

Primary Examiner—Matthew Kim
Assistant Examiner—Christian P. Chace
(74) Attorney, Agent, or Firm—Lynn L. Augspurger

(57) ABSTRACT

A central processor uses virtual addresses to access data via cache logic including a DAT and ART, and the cache logic accesses data in the hierarchical storage subsystem using absolute addresses to access data, a part of the first level of the cache memory includes a translator for virtual or real addresses to absolute addresses. When requests are sent for a data fetch and the requested data are not resident in the first level of cache the request for data is delayed and may be forwarded to a lower level of said hierarchical memory, and a delayed request may result in cancellation of any process during a delayed request that has the ability to send back an exception. A delayed request may be rescinded if the central processor has reached an interruptible stage in its pipeline logic at which point, a false exception is forced clearing all I the wait states while the central processor ignores the false exception. Forcing of an exception occurs during dynamic address translation (DAT) or during access register translation (ART). A request for data signal to the storage subsystem cancellation is settable by the first hierarchical level of cache logic. A false exception signal to the first level cache is settable by the storage subsystem logic.

8 Claims, 5 Drawing Sheets

FALSE EXCEPTION FOR CANCELLED DELAYED REQUESTS

FIELD OF THE INVENTION

This invention is related to computers and computer systems and in particular to handling cases where prefetching provides a miss or a result which may be canceled.

BACKGROUND OF THE INVENTION

Instruction and operand prefetching maximize the efficiency of a pipelined machine because they keep each stage of the pipeline busy. Prefetching can be done on sequential as well as branch paths. Most of the time, the data needed are resident in the cache, translation lookaside buffer (TLB) or ART look-aside buffer (ALB) and are immediately available. However, for cases where the data are not found, more time is required to fetch them from the storage subsystem, for dynamic address translation (DAT) or for access register translation (ART).

A problem arises when the miss is due to a prefetch along predicted paths which may or may not be taken. If the data will indeed be used, then performance benefits. However, if it turns out that the data will not be used, the cache, TLB or ALB latency increases and performance is degraded. In addition, this new fetch displaces a cache line, TLB entry or ALB entry that may be needed later.

SUMMARY OF THE INVENTION

We have addressed the aforementioned problem by providing the ability to cancel translation or outstanding line fetches to the storage subsystem of data that have been determined to be of little or no use. The mechanism used is to force a false exception on the delayed request. This approach shuts down all wait states without adding much hardware because the exception logic already exists. The exception sent back to the requester is ignored because the request was already rescinded. A rescinded request means that the requester does not want the data anymore and has already forgotten about it. Any response related to that request is ignored.

These and other improvements are set forth in the following detailed description. For a better understanding of the invention with advantages and features, refer to the description and to the drawings.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Figure 1:
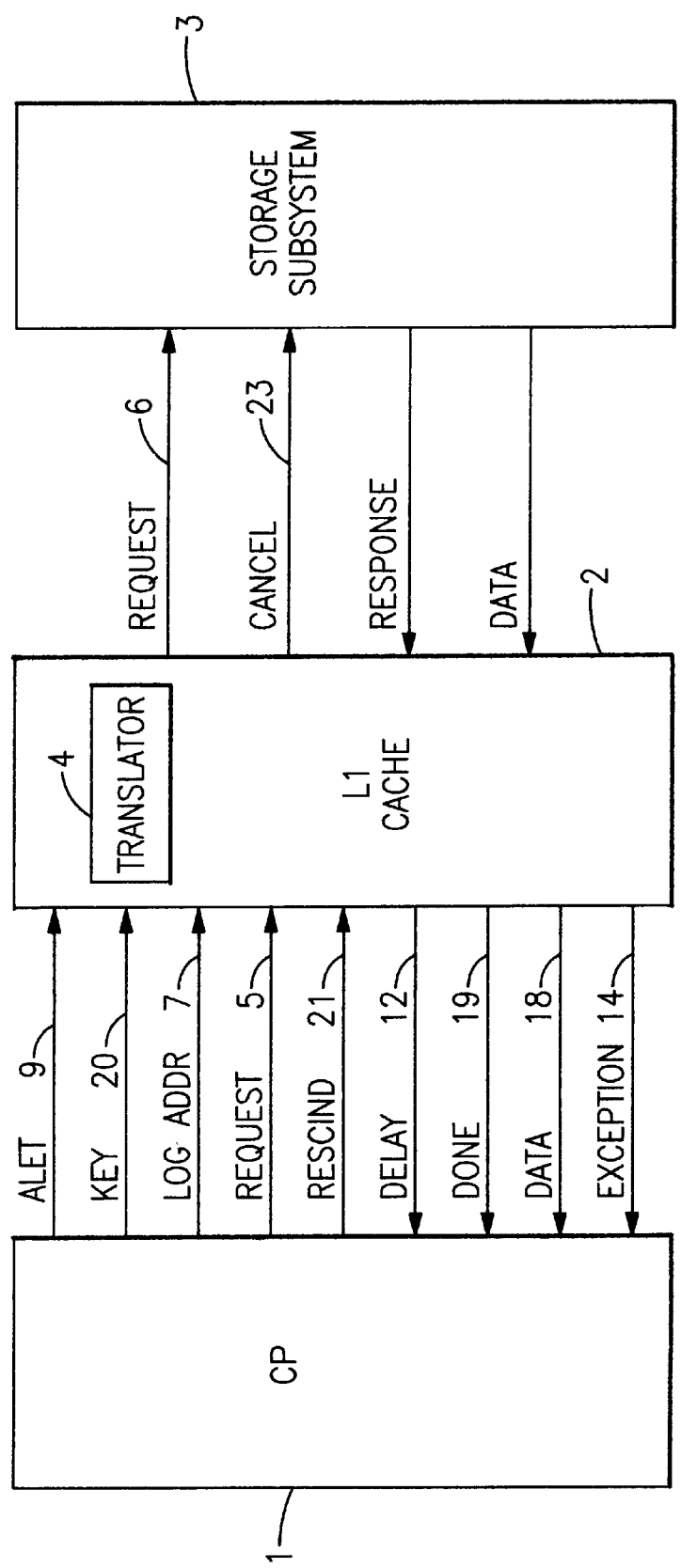
FIG. 1 shows a computer system built without the enhancement.

FIG. 1 shows a computer system built without the enhancement. The system is made up of a central processor (CP) (1), an L1 cache (2), and a storage subsystem (3). Part of the L1 cache is logic (translator) (4) that translates virtual or real addresses to absolute.

In this computer system, the CP sends requests (5) for data only to the L1 cache. If the data are not resident in L1, this L1 cache logic then sends a request (6) out to L2 (3). For purposes of this discussion, both the L1 cache and the storage subsystem use absolute addresses to access data. However, this invention can also apply to logically addressed L1 caches. The CP, on the other hand, uses logical addresses (7). These logical addresses can be absolute, real, or virtual. Most of the time the logical addresses sent by the CP to the L1 cache are virtual.

Figure 2:
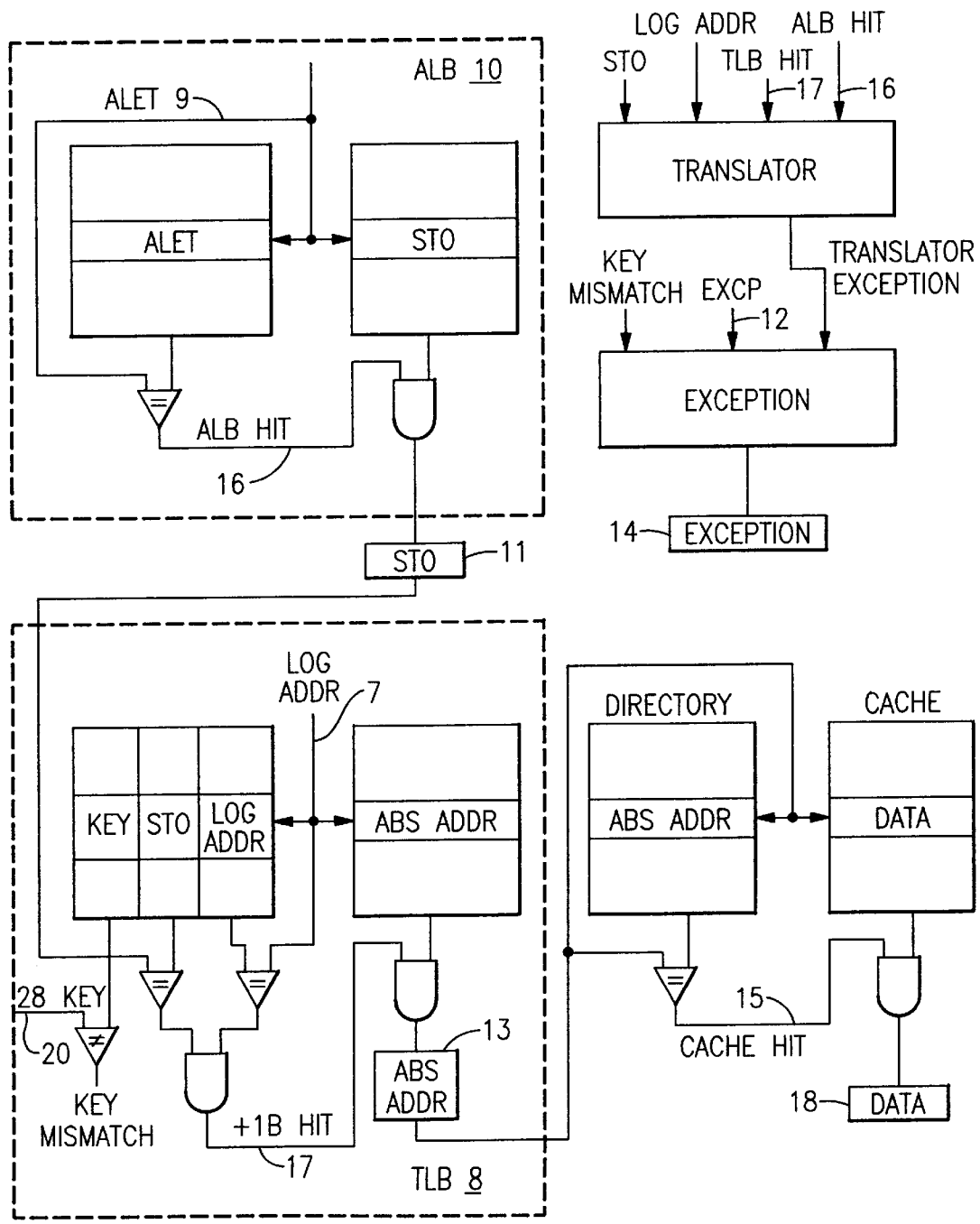
FIG. 2 is a more detailed diagram of the L1 cache logic.

FIG. 2 is a more detailed diagram of the L1 cache logic. Translation of logical to absolute addresses can become very complicated and can take several cycles. To translate from virtual to absolute, a pointer to translation tables called segment table origin (STO) (11) is needed. Sometimes, translation is also needed to generate the STO from an ALET (9). This is called access register translation or ART. An ART look-aside buffer (ALB) (10) is used to hold on to the most recently used mapping of ALETS (9) to STO's. Once a STO is generated, translation from virtual to absolute can proceed. A translation look-aside buffer (TLB) (8) is used to hold on to the most recently used mapping of logical to absolute addresses (13).

Sometimes, a fetch request (5) from the CP does not get data back from the L1 cache. There are several reasons why this may happen. First, this request may not have the necessary access privileges to the particular location in storage. Second, the address translation may not have been successful. In both cases, an exception condition (14) is returned instead of the data (18). Detection of exceptions can occur during translation, alb/tlb/L1 cache access, or storage subsystem access.

Once the virtual to absolute address translation is made, a CP data fetch to the L1 cache can have two outcomes. It can either be resident in the cache (a cache hit) (15) or it can miss (request delayed) (12). The following describe the possible outcomes of a CP fetch request to the L1 cache assuming no true exceptions are detected:

a. alb hit (16), tlb hit (17), cache hit (15)

Request done (19) and data (18) are returned a fixed number of cycles after the fetch request gets priority.

b. alb hit, tlb hit, cache miss

Data return is delayed (12) for a variable number of cycles. The L1 cache logic sends a fetch request to the storage subsystem. Data is returned to the CP when the storage subsystem sends back the line to the L1 cache.

c. alb hit, tlb miss

Data return is delayed for a variable number of cycles. The translator monitors the alb/tlb access results. If the request address needs translation, it starts the DAT pipeline. At the end of DAT, the absolute address is available and the cache is accessed. If the data are in the cache, a key only fetch request is sent out to storage. Otherwise, a key and data fetch request are sent out to storage. A key (20) controls the access privileges to the storage location. Data is returned to the CP when the storage subsystem sends back the key and line to the L1 cache.

d. alb miss

Data return is delayed for a variable number of cycles. The translator begins the ART pipeline. At the end of ART the STO is available but the virtual address still needs DAT. This request is recycled and cases a, b, or c can occur.

During this delayed request window, the CP may have determined that the data are not needed anymore. It then sends a rescind delayed request signal (21) to indicate that it does not want the data anymore.

This also indicates that the CP has forgotten the request and any L1 cache response will be ignored.

Figure 3:
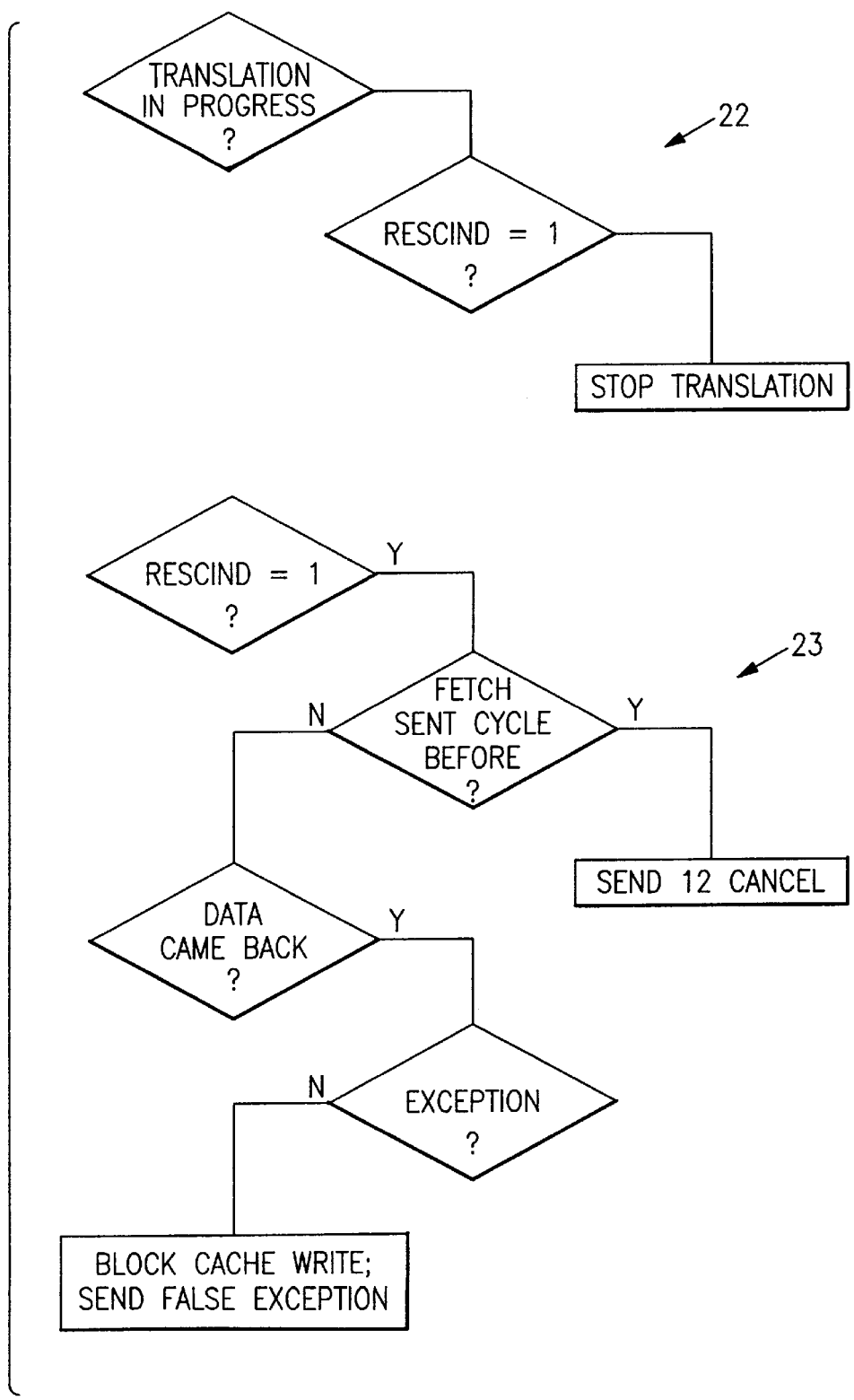
FIG. 3 is a flowchart of the prior art.

In prior art (FIG. 3), the DAT pipeline is immediately halted (22) whenever this rescind signal is set. This immediate shutdown added complex logic to the hardware to cover several window conditions.

The fetch request to storage will only be canceled (23) if the rescind signal is sent no later than one cycle after the fetch request has been sent. Otherwise, the cache logic waits for the data to come back. It forces a false exception and blocks the cache from being written. This solution adds complexity to the logic and cache latency is not shortened.

Figure 4:
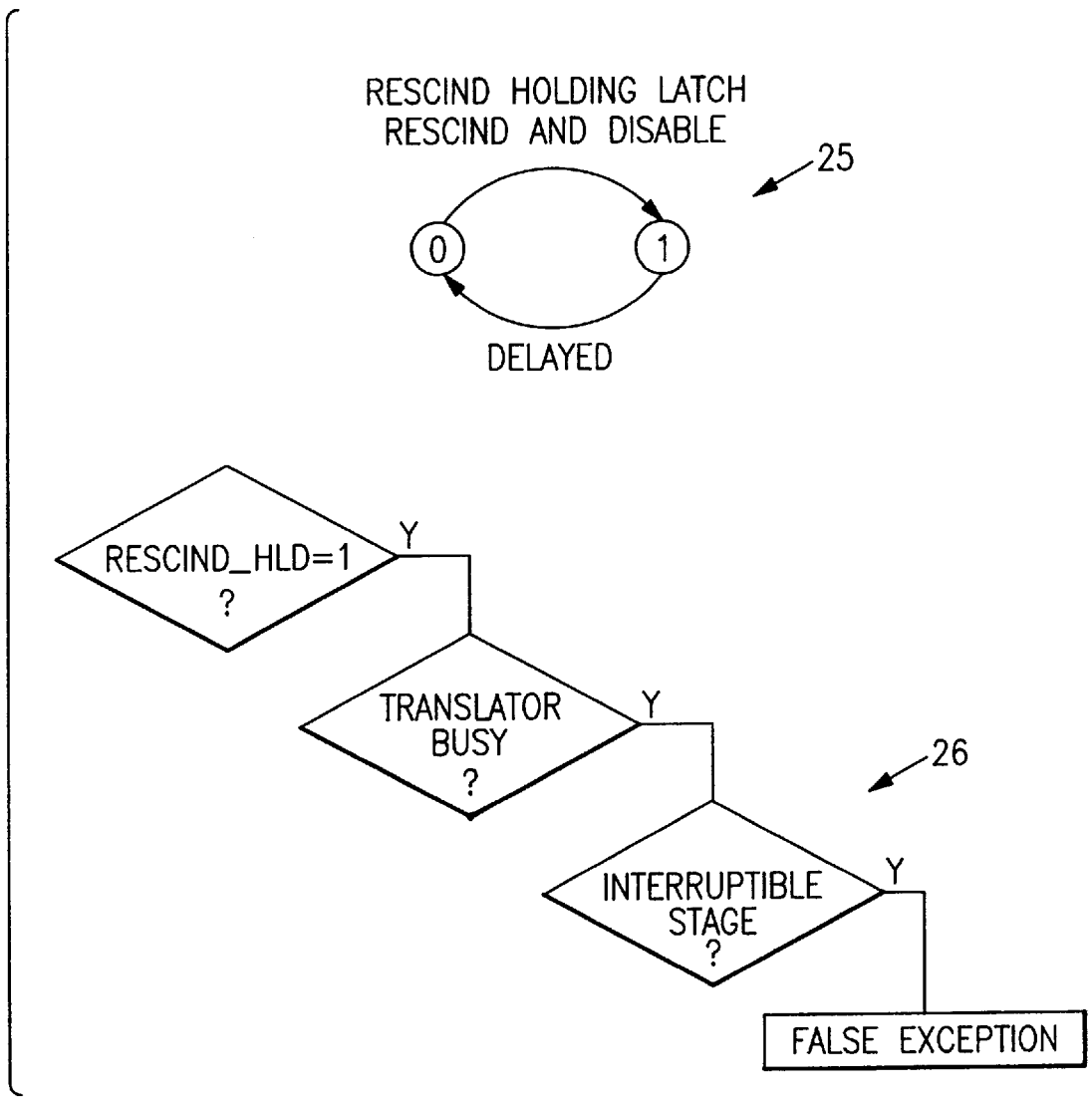
FIGS. 4 and 5 are flowcharts of the preferred embodiment.

In the preferred embodiment (FIG. 4), a rescind to the delayed request is only honored if the logic has reached an interruptible stage in its pipeline. At this point, a false exception is forced. This false exception clears all the wait states. Since the CP has forgotten the request, the false exception is ignored.

There are three parts to this invention. The first part is the forcing of an exception during DAT or ART. The second part is the setting of the cancel signal to the storage subsystem by the L1 cache logic. The third part is the setting of the false exception signal to the L1 cache by the storage subsystem logic.

When a request is delayed, the rescind signal is held (25) until the delayed request is serviced. If during DAT or ART, this held rescind signal is active and the translator is in an interruptible state in its pipeline, an exception is forced (26). This resets all the wait states in the translator and the cache control logic. By forcing a translation exception, extra hardware is minimized because existing exception shutdown logic is used. Also, the natural flow of ART or DAT is not disturbed because the exception is forced only in the cycles where the translator can detect exceptions.

Figure 5:
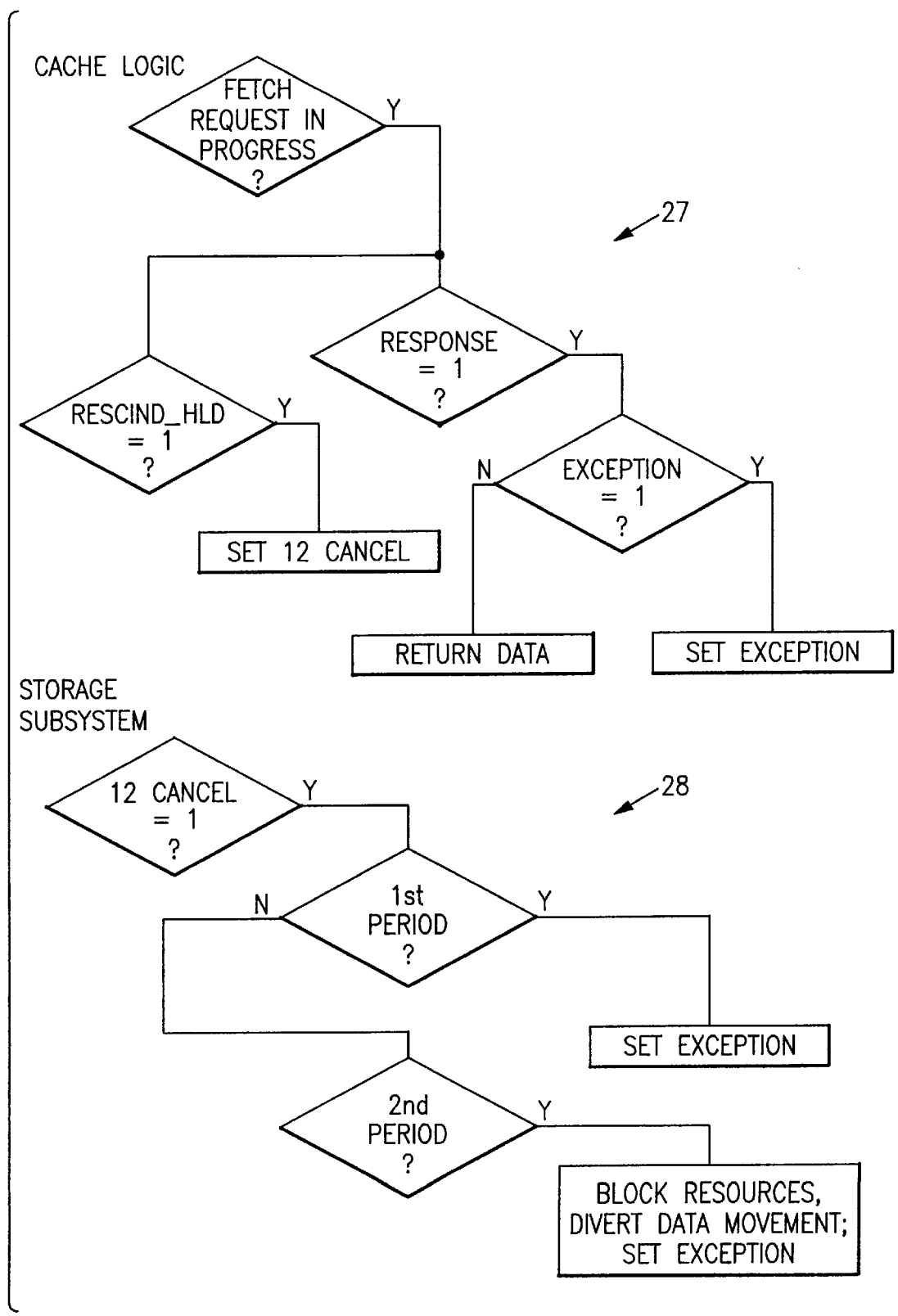

During an l1 cache miss (FIG. 5), this held rescind signal triggers the l1 cache logic to send a cancel fetch request signal to the storage subsystem (27). Because of the asynchronous nature of this cancel request, additional complex state machines could have been added in the l1 cache logic to halt the fetch pipeline. The simpler solution is to exploit existing shutdown mechanisms, one of which is the exception logic. When the storage subsystem receives this cancel command, it can force an exception back to the l1 cache logic and shut down all wait states. This solution is also flexible because of two reasons. First, it gives the storage subsystem the choice to ignore the cancel request and return the line anyway. Second, the flow of processing the request is not interrupted at inconvenient states. The exception is forced at existing states where the shutdown mechanism already exists. Additional window conditions are avoided.

The third part of the solution involves the Fetch Requestor (FR) in the storage subsystem. It works as an agent of the processor to retrieve requested data from the storage subsystem. The FR determines if the state of the fetch can be stopped without entering an invalid state. If the cancel is accepted, a false exception response is returned without data. If the cancel is not accepted, the fetch request is processed as normal.

The fetch request process, initiated by FR, can be separated into three periods with respect to cancel (28). During the first period, state changes are limited to FR and no data movement or ownership change has occurred in the storage hierarchy. If the cancel is received during this period, it is accepted and the exception response sent. Period two is characterized by some data movement and/or ownership changes but the cancel is received in time to limit these changes to the storage subsystem, no data or related responses have been sent to the processor. Diverting data movement and blocking resources during this period is more complicated than the first, but it allows cancels to be accepted until very late in the fetch request operation. If the cancel response is received after the point when data transfers and/or responses can be blocked, it falls into the third period. In this period, a cancel is ignored and the fetch completes unimpeded by the cancel request.

This solution can be generalized to cancel any process during a delayed request that has the ability to send back an exception. It doesn't have to be limited to an absolute addressed cache. The processor also provides for separate disable mechanisms in the three elements.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A computer system comprising:

a central processor having a pipeline for processing data and a prefetching mechanism for fetching lines of data from a hierarchical memory system storing lines of data to be used in said central processor's pipeline and having a mechanism for rescinding delayed requests for data to be fetched from said hierarchical memory system, said hierarchical memory system having at least a first level of cache memory and a storage subsystem, including main memory, said central processor using logical addresses which are absolute and virtual addresses to access data, and often using virtual addresses for requests for data to be fetched from said storage subsystem, said hierarchical memory system using absolute addresses to access data, and including as a part of the first level of the cache memory a translator with translation logic that translates virtual and real addresses to absolute addresses, and wherein said central processor sends requests for data to said hierarchical memory system via the first level cache, and when requested data are not resident in the first level of cache the request for data is delayed and is forwarded to a lower level of said hierarchical memory, and when results in cancellation of any process during a delayed request that sends back an exception for rescinding outstanding line fetches and for canceling translations of data prefetched from said memory which are not needed for future processing, wherein a cancellation request is sent to storage subsystem and to said translation, and either the storage subsystem and translator may honor the request for recision or not honor the request for recision, and while said delayed request may be rescinded by said central processor, it is only honored after the central processor has reached an interruptible stage in its pipeline logic at which point an exception for rescinding outstanding line fetches and for canceling translations of data prefetched from said memory which are not needed for future processing is forced clearing all the wait states while the central processor ignores the exception for rescinding outstanding line fetches and for canceling translations of data prefetched from said memory which are not needed for future processing and until the last interruptable state is reached a request for recision is ignored and the delayed request is completed.

2. The computer system according to claim 1 wherein forcing of an exception for rescinding outstanding line fetches and for canceling translations of data prefetched from said memory which are not needed for future processing occurs during dynamic address translation (DAT) or during access register translation (ART).

3. The computer system according to claim 1 wherein a request for data signal to the storage subsystem cancellation is settable by the first hierarchical level of cache logic.

4. The computer system according to claim 1 wherein an exception signal to the first level cache is settable by the storage subsystem logic for forcing an exception for rescinding outstanding line fetches and for canceling translations of data prefetched from said memory which are not needed for future processing.

5. The computer system according to claim 2 wherein when a request for data is delayed, the rescind signal is held active until the delayed request is serviced, and if during DAT or ART, said held rescind signal is active and the translator is in an interruptible state in its pipeline, an exception for rescinding outstanding line fetches and for canceling translations of data prefetched from said memory which are not needed for future processing is forced which resets all the wait states in the translator and in cache control logic.

6. The computer system according to claim 5 wherein during a first level cache miss said active held rescind signal triggers said cache control logic to send a cancel fetch request signal command to the storage subsystem, and when the storage subsystem receives this cancel fetch request signal command, it forces an exception for rescinding outstanding line fetches and for canceling translations of data prefetched from said memory which are not needed for future processing back to the first level cache logic and shuts down all wait states.

7. The computer system according to claim 6 wherein is included a fetch requester in the storage subsystem functioning as an agent of the central processor to retrieve requested data from the storage subsystem, said fetch requester determining whether cancellation of a fetch will be accepted without entering an invalid state, and if a cancel is accepted, an exception response is returned without data, but if the cancel is not accepted, the fetch request is processed as normal.

8. The computer system according to claim 7 wherein a fetch request process, initiated by fetch requester provides three periods with respect to a cancellation, wherein during a first period, state changes are limited to fetch requester and no data movement or ownership change has occurred in the storage hierarchy, and if a cancellation is received during this first period, said cancellation is accepted and an exception response sent; and wherein during a second period some ownership changes but when a cancellation is received in time to limit these changes to the storage subsystem, no data or related responses have been sent to the processor and cancellations can be accepted in said second period until very late in the fetch request operation, while if in said second period a cancellation response is received after the point when data transfers and responses can be blocked, the cancellation would be passed into a third period when a cancel is ignored and the request to fetch data completes unimpeded by any cancellation request.

* * * * *